United States Patent [19]

Wright

[11] 4,056,285

[45] Nov. 1, 1977

[54] COLLAPSIBLE TIRE WHEEL

[76] Inventor: Thomas Wright, 1783 A. Pacific St., Brooklyn, N.Y. 11213

[21] Appl. No.: 776,530

[22] Filed: Mar. 11, 1977

[51] Int. Cl.² .......................... B60B 3/12; B60B 25/02
[52] U.S. Cl. .......................................... 301/8; 301/32; 301/63 R; 301/63 DT
[58] Field of Search ................ 301/5 R, 8, 9 R, 12 M, 301/15-16, 30-32, 63 R, 63 DT; 152/377

[56] References Cited

U.S. PATENT DOCUMENTS

| 1,437,105 | 11/1922 | Howell | 301/32 X |
| 1,476,916 | 12/1923 | Parker | 301/32 |
| 1,634,454 | 7/1927 | Christia et al. | 152/377 |

Primary Examiner—Allen N. Knowles
Assistant Examiner—Charles A. Marmor
Attorney, Agent, or Firm—Allen D. Brufsky

[57] ABSTRACT

A collapsible wheel rim structure adapted to support an inflated tire including a rim formed from pivotally mounted rim sections, and an internal plate support for the rim which fits into an internal track on the rim. The disc is formed from sections slidably mounted together which when fully extended enclose the area within the rim and support the rim. Supplementary rim support can be provided with collapsible cross-bars which fit into prongs on the internal surface of the rim so that the cross-bars extend across the internal diameter of the rim.

3 Claims, 5 Drawing Figures

COLLAPSIBLE TIRE WHEEL

PRIOR ART

The following patents are considered pertinent:
U.S. Pat. No. 1,201,747
U.S. Pat. No. 1,250,909
U.S. Pat. No. 1,268,799
U.S. Pat. No. 1,358,923
U.S. Pat. No. 1,450,787
U.S. Pat. No. 1,458,007
U.S. Pat. No. 1,500,412
U.S. Pat. No. 1,862,415

BACKGROUND OF THE INVENTION

This invention relates to collapsible wheel rims particularly used to support pneumatic tires.

An object of this invention is to provide a wheel rim structure that can be assembled and disassembled by hand to mount or dismount inflatable tires thereon.

It is a further object of this invention to provide a collapsible wheel rim of simple and inexpensive construction which provides support for an inflated tire mounted on a vehicle.

Further objects of this invention will be evident in view of the following detailed disclosure.

SUMMARY OF THE INVENTION

In accordance with this invention, the wheel rim structure comprises a collapsible rim and a sectioned internal disc support. Optionally, a collapsible cross-bar support for the wheel rim is provided. The collapsible rim includes a track on at least a portion of its internal surface to house a disc formed of sections adapted to slide relative to each other to form a disc which covers the internal area of the rim. The disc is provided with a central hole through which a wheel axle can be extended.

DETAILED DESCRIPTION OF THE PREFERRED EMBODIMENT

Figure 1:
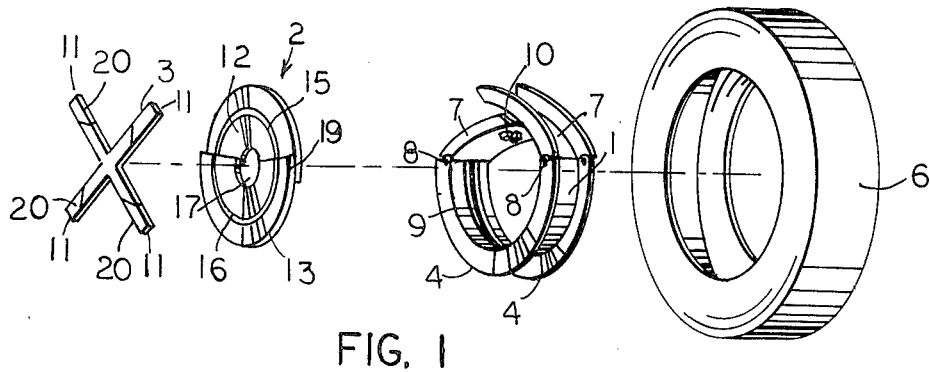
FIG. 1 is an exploded perspective view of the rim structure of this invention.

Referring to FIG. 1, the wheel rim structure of this invention includes a collapsible wheel rim, a sectional disc support 2 and optionally a cross-bar support 3. The wheel rim 1 includes flanges 4 which extend around the periphery of wheel 1 and are adapted to enclose and retain the tire 6. The wheel rim 1 includes two collapsible sections 7 which are pivotally mounted on hinges 8. An internal track 9 is provided to retain plate 2 within the internal area of rim 1. The rim 1 also can include prongs 10 which are positioned with opposing prongs on rim 1 at diametrically opposed positions and adapted to fit within the hollow ends 11 of cross-bar 10.

Figure 2:
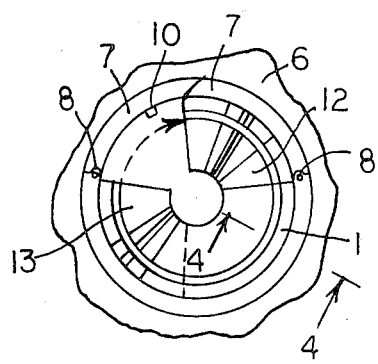
FIG. 2 is a side view of the rim structure showing the disc portion partially formed.
Figure 3:
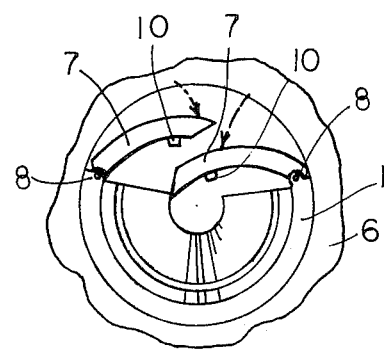
FIG. 3 is a side view of the collapsible rim in place on a tire.
Figure 4:
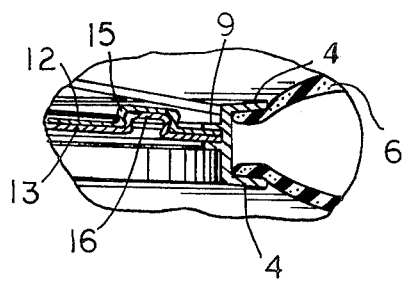
FIG. 4 is a cross-sectional view taken along line 4—4 of FIG. 2.
Figure 5:
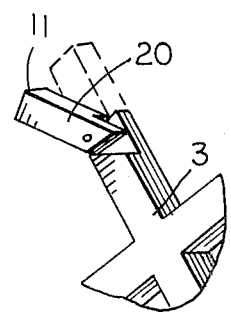
FIG. 5 is a partial perspective view of the cross-bar support.

The disc 2 is formed from two mutually slidable plate sections 12 and 13. The thicknesses of the plate sections 12 and 13 are such that the disc 2 fits into track 9 when the plate section 12 and 13 are contiguous. Plate sections 12 and 13 each are provided with extensions 15 and 16 of reentrant configuration to retain the sections 12 and 13 together when the disc 2 is not extended or is partially extended (as shown in FIG. 2) and is fully extended (as shown in FIG. 1). The disc 2 is provided with a central hole 17 so that the wheel rim can be mounted on an axle of a vehicle by any conventional means. The plate sections 12 and 13 can be provided with conventional means for locking them together when they are fully extended such as with holes to accommodate locking pins extending through the overlapped sections 19 of the plate section 12 and 13 when the plate sections are fully extended.

When it is desired to mount a tire on the wheel rim structure, a uninflated tire 6 is placed on wheel rim 1 within flanges 4 and the rim sections 7 are pivoted outwardly to form a circle corresponding generally to the internal open space of the tire 6. The rim sections can be provided with any conventional locking means to lock them together if desired. The disc 2 is positioned in track 9 and the plate sections 12 and 13 are fully extended to enclose the area within rim 1. If desired, the ends 11 of cross-bar 3 are mounted on prongs 10 and the cross-bar extensions 20 are pivoted to fully extend the arms of the cross-bar and to lock it into position within the rim.

It is to be understood that this invention is not limited to the specific embodiments set forth above, but include modifications which are obvious to those skilled in the art.

I claim:

1. A tire supporting rim comprising:
   a. a wheel rim having a track on its internal surface and at least one pivotable section, said wheel rim adapted to fit within a tire when said pivotable section is fully extended, and
   b. a sectioned disc formed from mutually slidable plates adapted to fit within said track to support said wheel rim when said sections are slidably extended, said plate sections including extensions of reentrant configuration to retain said sections together in slidable relationship.

2. The rim of claim 1 wherein said wheel rim includes two pivotable sections.

3. The rim of claim 1 including a collapsible cross-bar adapted to lock within the internal area of said rim.